Sept. 15, 1931.  F. P. RYDER  1,823,410
DOUBLE VINER
Filed Dec. 12, 1929  3 Sheets-Sheet 1

Inventor
Frank P. Ryder,
By A. P. Greeley
Attorney

Sept. 15, 1931. F. P. RYDER 1,823,410
DOUBLE VINER
Filed Dec. 12, 1929 3 Sheets-Sheet 2

Inventor
Frank P. Ryder,
By A. P. Greeley
Attorney

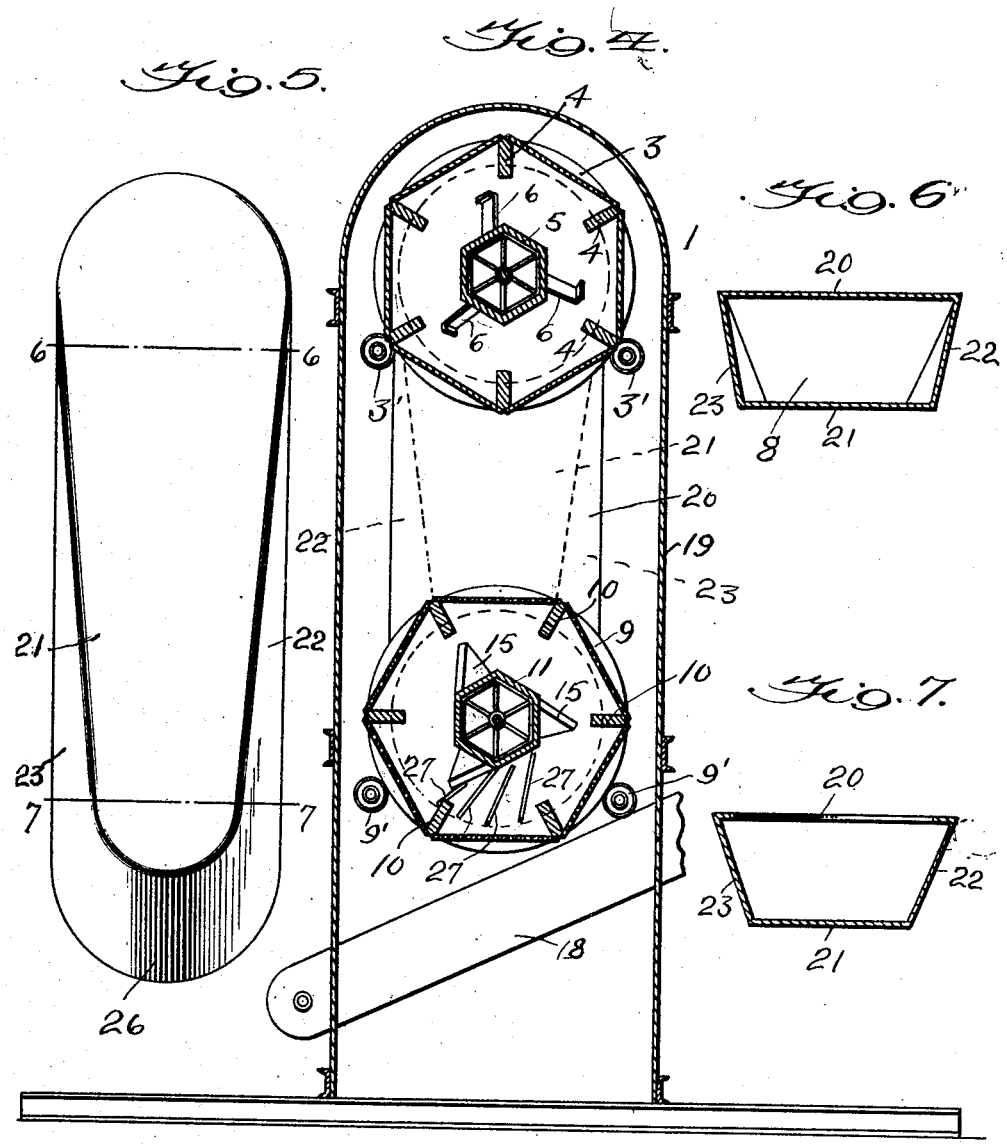

Patented Sept. 15, 1931

1,823,410

UNITED STATES PATENT OFFICE

FRANK PITTIS RYDER, OF NIAGARA FALLS, NEW YORK

DOUBLE VINER

Application filed December 12, 1929. Serial No. 413,556.

My invention relates to viners, that is, machines for threshing peas or beans from the vines or bushes on which they are grown, and is particularly adapted and intended to subject the vines or bushes to successive threshing operations so that the peas or beans left on the vines by the first threshing operation will be completely recovered by the second operation.

Threshing machines, commonly termed viners, are extensively employed in threshing green peas. Such machines comprise an outer "cylinder", usually hexagonal for convenience in construction, rotating at relatively slow speed having longitudinal lifting bars for lifting the vines supplied to it and an inner concentric "cylinder" also usually hexagonal, provided with outwardly extending beater arms and rotated at a relatively high speed. As it is known that it is desirable to thresh out as large a proportion of the peas as possible without rotating the beater cylinder at a speed which might damage the peas which are readily threshed out, it is not unusual to subject the vines to the threshing action of a viner in which the beater cylinder is run at relatively low speed and then subject the vines freed from readily dislodged peas but still carrying unopened pods, to a viner in which the beater cylinder is run at a much higher speed, the two viners being arranged tandem. This requires two complete viners and two complete conveyors. The two viners require considerable floor space and the effective transfer of the vines from the first to the second viner is a matter of considerable difficulty and requires driving power.

An object of my invention is to provide a simple and compact combination of two viners each adapted to be driven at any desired speed. A further object of my invention is to provide for transferring viners from the first viner to the second viner by gravity without the necessity of a power driven conveyor. A further object of my invention is to provide a chute for conducting vines to a viner which will not be choked by the vines. A further object of my invention is to provide means for feeding vines from the chute to a viner.

With the objects above indicated and other objects hereinafter explained in view my invention consists in the construction and combination of elements hereinafter described and claimed.

Referring to the drawings:

Figure 4 is a perspective view of the lower end of the chute.

Figure 5 is a back view of the chute for conducting the vines from the upper to the lower viner.

Figure 6 is a cross sectional view on line 6—6 of Figure 5, and

Figure 7 is a cross sectional view on line 7—7 of Figure 5.

Figure 1:
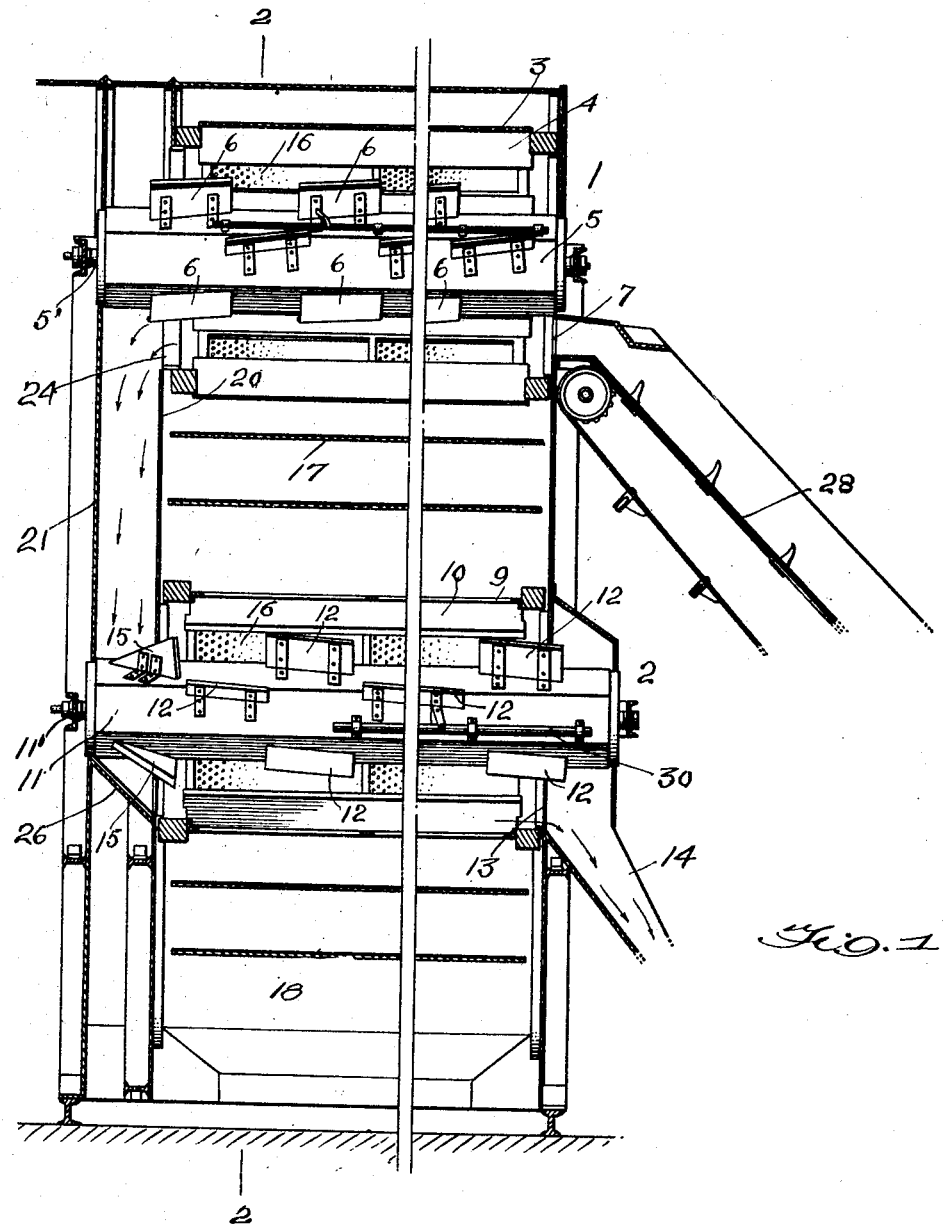
Figure 1 is a vertical central sectional view of a double viner embodying my invention, on a plane of the axes of the beater cylinders.

In the drawings 1 indicates the upper viner and 2 indicates the lower viner. The upper viner is of the usual construction comprising the outer or lifting cylinder 3 with lifting bars 4, and the inner or beater cylinder 5 carrying beater arms 6 arranged at such angles to the longitudinal axis of the cylinder as to cause the vines to move from the intake opening 7, at the right in Figure 1, to the other end of the viner. The rear end of the upper viner is open and the end of the beater cylinder projects beyond this open end into the chute.

The lower viner 2 is also of usual construction comprising the outer or lifting cylinder 9 with its lifting ribs or bars 10 and the inner or beater cylinder 11 carrying beater arms 12 which are arranged at such angle to the longitudinal axis as to cause the vines to move from left to right as shown in Figure 1, that is, from the lower end of chute 8 to discharge opening 13 and discharge chute 14, these beater arms being preferably adjustable by adjusting rod 30.

The beater cylinder in this lower viner differs, however, from the beater cylinder of the usual viner in that its end opposite the discharge opening 13 extends, to the left in Figure 1, beyond the end of the lifting cylinder 9, projecting into the lower end portion of chute 8 and carries at this end feeding arms 15 having their outer edges tapered as shown, set at an angle to the longitudinal axis of the beater cylinder somewhat greater than the angle at which the beater arms 12 are set, so as to feed the vines from chute 8 into the viner.

Figures 2, 3:
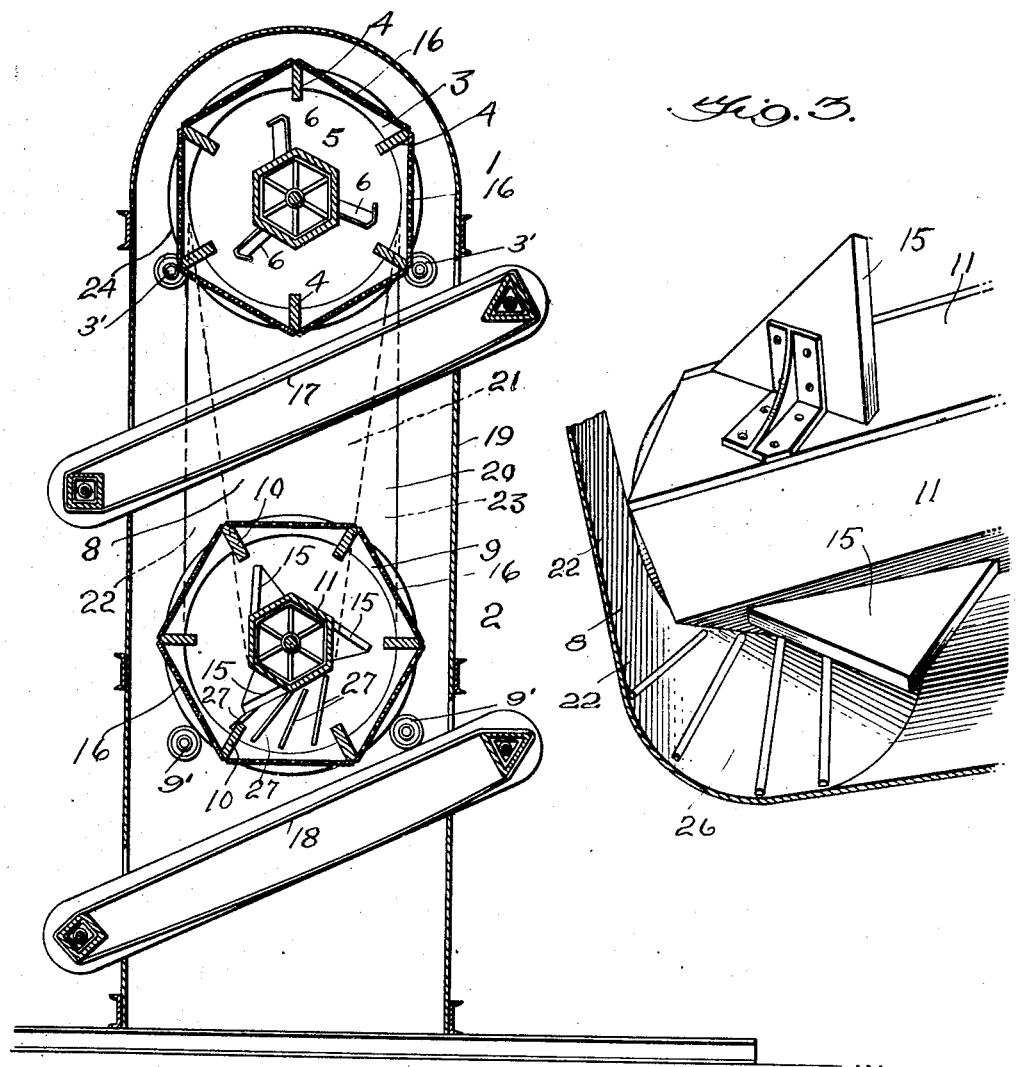
Figure 2 is a vertical cross sectional view on line 2—2 of Figure 1.
Figure 3 is a view similar to Figure 4 but showing a modification.

The lifting cylinders 3 and 9 of the upper and lower viners respectively are, in the construction shown in Figures 1 and 2, provided with the usual screens 16 preferably formed, as in the usual viner construction, of sheets of rubber fabric extending from one lifting bar 4, (or 10) to the next adjacent bar and suitably perforated to permit the peas threshed out by the beater arms to escape and to fall from the upper viner onto the usual conveyor belt 17 and to fall from the lower viner onto a similar belt 18.

The rear end rings of the lifting cylinders 3 and 9 are carried by rollers $3^1$ and $9^1$ respectively.

19 indicates an enclosing casing for the two viners and may be of any convenient material or shape and forms no part of my present invention, and may be omitted if desired.

Chute 8, as here shown, is formed of a front plate 20 having parallel edges, a back plate 21, and side plates 22 and 23, cut away at its upper end as indicated at 24 to fit about the periphery of the lifting cylinder 3 of the upper viner and cut away at its lower end to fit the upper half of the periphery of the lifting cylinder 9 of the lower viner. Back plate 21 is, at its upper end, of the same width as the front plate 20, but is narrowed towards its lower end so that at a point opposite the beater cylinder it is of about the width of the diameter of the beater cylinder 11. Side plates 22 and 23 connect the edges of front and back plates 20 and 21. Between side plates 22 and 23 opposite the intake end of lower viner 2, at the left in Figure 1 is a plate 26 so curved as to form a half frustrum of a cone with its smaller end against the back plate and of a diameter substantially that of beater cylinder 11 and its larger end of a diameter substantially that of the lifting cylinder 9, this plate 26 forming the lower end of chute 8 and adapted by reason of its cone shape to direct vines falling from the upper viner through the chute into the lifting cylinder 9. The rear end of beater cylinder 11 extends into this cone and the beater arms 15 by reason of their inclination relative to the axis of the beater cylinder will act upon the vines to feed or draw them into the viner. In order to avoid the tendency of these feeding arms to carry the vines about the ends of the beater cylinder and to thus choke the chute, the conical plate 26 is provided on its interior with ribs 27 extending, in a general direction, forward, that is, toward the discharge end of the lower viner and, in a general direction, inward, that is, toward the axis of the beater cylinder. These plates are so formed that there will be a slight clearance between their free edges and the edges of feeding arms 15.

But while these plates 27 have the general direction stated they are not radial nor parallel with the axis of the beater cylinder but are inclined from a radial line in the direction in which the beater cylinder rotates and are inclined from parallelism with the axis of the beater cylinder in the direction in which the beater cylinder rotates so that while they serve to hold the vines against being carried around the beater cylinder by the feeding arms their inclination is such as to cause the vines sliding over them to move towards the interior of lifting cylinder 11.

Shaft $5^1$ of the beater cylinder of the upper viner and shaft $11^1$ of the lower beater cylinder extend through the back plate 21 of chute 8.

In operation the vines carrying pea, or bean, pods are supplied to intake opening of the upper viner by the usual conveyor 28 and as they pass through it to the open rear end of the lifting cylinder are acted on by the beater arms 6 to cause most of the pods to open and release the peas, or beans, which escape through the openings in the screens 16 to fall on the conveyor belt 17. The vines after most of the peas, or beans, are thus threshed out, but still carrying more or less unopened pods, are discharged into chute 8 and fall through it into contact with feeding arms 15 to be carried down into contact with the inclined plates 27 and by the cooperation of the feeding arms and these plates 27 are fed into the lower viner and subjected to the action of beater arms 12 and carried forward to discharge opening 13 and chute 14. This second threshing of the vines opens whatever pods remain unopened by the action of viner 1, the peas, or beans, escaping through the openings of screens 16 onto conveyor belt 18.

In Figure 3 is shown a modification in which the conveyor belt 17 for the upper viner is omitted. This is a satisfactory arrangement when the machine is to be used for threshing green peas, the lower conveyor belt being sufficient to take care of the peas from both viners. In threshing lima beans it is desirable to use a conveyor belt for the upper viner as in the construction shown in Figure 1 as well as for the lower viner. White, that is, over-mature, lima beans, are hard and undesirable for canning. Because of their hardness, or the brittleness of the pod in which they are carried, they are readily threshed out in the upper viner while the pods carrying the less mature green beans pass unopened down the chute to the lower viner. By suitably adjusting the speed of rotation of the beater cylinders of the two viners a very large percentage of white beans will be carried off by the upper conveyor belt and the beans carried off by the lower conveyor belt will be practically free from white beans.

It will, of course, be understood that viners 1 and 2 will be separately driven at such relative speeds of rotation of the two beater cylinders and lifting cylinders as may be desired. It is found in operation that if the beater cylinder of the upper viner is driven at 120 revolutions per minute and the beater cylinder of the lower viner is driven at 160 revolutions per minute satisfactory threshing is effected, but I do not desire to be limited to any particular speeds of rotation or to any difference in speeds of rotation of the beater cylinders.

It will, of course, be understood that while my invention is above described for threshing green peas, it is not to be limited to such use as it may be used for separating or threshing seeds of any kind from vines or bushes, whether green or dry.

It is further to be understood that while the first viner is shown arranged directly above the second viner I do not desire to be limited to this arrangement as it is essential only that the first viner be so arranged that the vines will be discharged into chute 8 or conveyor from its discharge end into the upper end of chute 8 to be fed to the second viner.

It is further to be understood that I do not desire to be limited to the use of the chute shown and described for transferring vines from one viner to another as it may be used for conveying vines from any source of supply to a viner, nor do I desire to be limited to use of the chute for conveying vines from an upper viner to a lower viner as it is adapted to transfer vines from a lower to an upper viner.

Having thus described my invention what I claim is:

1. A chute for conveying vines to a viner having its body portion extending downward and having at its delivery end a cone shaped portion provided interiorly with guide ribs and adapted to receive within it the end of the beater cylinder of a viner.

2. A chute for conveying vines to a viner having its body portion extending downward and having a cone shaped portion at its delivery end in combination with a viner having its beater cylinder extending into the cone shaped portion of the chute and provided with feeding arms shaped to draw vines from said cone shaped portion of the chute into the viner.

3. A chute for conveying vines to a viner having its body portion extending downward and having a cone shaped portion at its delivery end provided interiorly with forwardly extending ribs, in combination with a viner having its beater cylinder extending into the cone shaped portion of the chute and provided with means adapted to cooperate with the ribs in said cone shaped portion of the chute to draw vines into the viner.

4. A chute for conveying vines to a viner having its body portion extending downward and having a cone shaped portion at its delivery end provided interiorly with forwardly extending ribs, in combination with a viner having its beater cylinder extending into the cone shaped portion of the chute and provided with feeding arms adapted to cooperate with the ribs in said cone shaped portion of the chute to draw vines into the viner.

5. In a machine for threshing green peas or beans a pair of viners each comprising an outer lifting cylinder open at its rear end and a beater cylinder within the lifting cylinder and a chute connecting the open rear ends of the lifting cylinders having opposite the open rear end of the lifting cylinder of the second viner an inclined plate adapted to direct vines into said open rear end of said lifting cylinder of the other viner.

6. In a machine for threshing green peas or beans a pair of viners each comprising an outer lifting cylinder open at its rear end and a beater cylinder within the lifting cylinder, and a chute connecting the open rear ends of the lifting cylinders having opposite the open rear end of the lifting cylinder of the second viner an inclined plate adapted to direct the vines into said open rear end of said lifting cylinder of the second viner, and means carried by the rear end of the beater cylinder of the second viner cooperating with said inclined plate for feeding vines from the chute into the lifting cylinder of said second viner.

7. In a machine for threshing green peas or beans, an upper viner having a discharge opening at its rear end and a lower viner having an intake opening at its rear end and a chute connecting the discharge opening of the upper viner with the intake opening of the lower viner, said chute having its rear face narrowed towards its lower end and having opposite the intake opening of the lower viner a plate curved to semiconical form with its front end in register with the intake opening of said lower viner.

8. In a machine for threshing green peas or beans, an upper viner having a discharge opening at its rear end and a lower viner having an intake opening at its rear end and a chute connecting the discharge opening of the upper viner with the intake opening of the lower viner, said chute having its rear face narrowed towards its lower end and having opposite the intake opening of the lower viner a plate curved to a semiconical form with its front end in register with the intake opening of said lower viner, and means carried by the beater cylinder of the lower viner extending into the hollow of said semiconical plate adapted to feed vines therefrom into the intake opening of the lower viner.

9. In a machine for threshing green peas or beans, an upper viner having a discharge opening at its rear end and a lower viner having an intake opening at its rear end and a chute connecting the discharge opening of the upper viner with the intake opening of the lower viner, said chute having its rear face narrowed towards its lower end and having opposite the intake opening of the lower viner a plate curved to semiconical form with its front end in register with the intake opening of the lower viner, and means carried by the beater cylinder of the lower viner extending into the hollow of said semiconical plate adapted to feed the vines therefrom into the intake opening of said lower viner, semiconical plate being provided with forwardly extending ribs.

10. In a machine for threshing green peas or beans, an upper viner having a discharge opening at its rear end and a lower viner having an intake opening at its rear end and a chute connecting the discharge opening of the upper viner with the intake opening of the lower viner, said chute having its rear face narrowed towards the lower end and having opposite the intake opening of the lower viner a plate curved to semiconical form with its front end in register with the intake opening of the lower viner, feeding arms carried by the beater cylinder of the lower viner extending into the hollow of said semiconical plate adapted to feed vines therefrom into the intake opening of said lower viner, and forwardly extending ribs carried by said semiconical plate adapted to cooperate with said feeding arms of the beater cylinder to cause the vines to move into the intake opening of said lower viner.

11. In a machine for threshing green peas or beans an upper viner having a discharge opening at its rear end and a lower viner having an intake opening at its rear end and a chute connecting the discharge opening of the upper viner with the intake opening of the lower viner, said chute having its rear face narrowed towards its lower end and having opposite the intake opening of the lower viner a plate curved to semiconical form with its front end in register with the intake opening of the lower viner, and means carried by the beater cylinder of the lower viner extending into the hollow of said semiconical plate adapted to feed the vines therefrom into the intake opening of said lower viner.

12. In a machine for threshing green peas or beans, an upper viner having a discharge opening at its rear end and a lower viner having an intake opening at its rear end and a chute connecting the discharge opening of the upper viner with the intake opening of the lower viner, said chute having its rear face narrowed towards its lower end and having opposite the intake opening of the lower viner a plate curved to semiconical form with its front end in register with the intake opening of the lower viner, and means carried by the beater cylinder of the lower viner extending into the hollow of said semiconical plate adapted to feed vines therefrom into the intake opening of said lower viner.

13. In a machine for threshing green peas or beans an upper viner having a discharge opening at its rear end and a lower viner having an intake opening at its rear end and a chute connecting the discharge opening of the upper viner with the intake opening of the lower viner, said chute having its rear face narrowed towards its lower end and having opposite the intake opening of the lower viner a plate curved to semiconical form with its front end in register with the intake opening of the lower viner, feeding arms carried by the beater cylinder of the lower viner extending into the hollow of the semiconical plate adapted to feed vines therefrom into the intake opening of said lower viner and ribs extending forward from the semiconical plate adapted to guide the vines toward the intake opening of the lower viner.

In testimony whereof, I hereunto affix my signature.

FRANK PITTIS RYDER.